United States Patent
Tsai et al.

(10) Patent No.: US 7,070,279 B2
(45) Date of Patent: Jul. 4, 2006

(54) MULTIPLE-FUNCTION PROJECTING APPARATUS

(75) Inventors: Chris Tsai, Taipei (TW); Fang-Yuan Shyu, Taipei (TW)

(73) Assignee: Lite-On Technology Corp., Taipei (TW)

( * ) Notice: Subject to any disclaimer, the term of this patent is extended or adjusted under 35 U.S.C. 154(b) by 776 days.

(21) Appl. No.: 10/223,657

(22) Filed: Aug. 20, 2002

(65) Prior Publication Data

US 2004/0036842 A1    Feb. 26, 2004

(51) Int. Cl.
G03B 31/00 (2006.01)
G03B 21/26 (2006.01)
G03B 21/00 (2006.01)
H04N 5/64 (2006.01)

(52) U.S. Cl. ............ 353/15; 353/30; 353/122; 348/744

(58) Field of Classification Search ............ 353/15, 353/30, 31, 122; 705/14; 709/102; 710/129; 455/414.1; 386/94; 370/352; 379/220.01; 348/744

See application file for complete search history.

(56) References Cited

U.S. PATENT DOCUMENTS

| | | | | |
|---|---|---|---|---|
| 6,298,370 | B1* | 10/2001 | Tang et al. | 718/102 |
| 6,356,968 | B1* | 3/2002 | Kishon | 710/306 |
| 2003/0059025 | A1* | 3/2003 | Meyerson et al. | 379/220.01 |
| 2003/0216962 | A1* | 11/2003 | Heller et al. | 705/14 |
| 2004/0057698 | A1* | 3/2004 | Frederick et al. | 386/94 |
| 2004/0235460 | A1* | 11/2004 | Engstrom et al. | 455/414.1 |

* cited by examiner

*Primary Examiner*—Melissa Jan Koval
(74) *Attorney, Agent, or Firm*—Birch, Stewart, Kolasch & Birch, LLP

(57) ABSTRACT

A multiple-function projecting apparatus comprises a processor unit being a controller of the projecting apparatus and having built-in operation system and application programs and a plurality of interfaces. The interfaces includes an audio I/O interface, a wireless communication interface for wireless connection to wireless accessing point, a wired communication interface for wired connection to wired accessing point, an expansion memory interface for data storage and accessing, a display driver interface used to output an image from the processor unit, and a display unit connected to the display driver interface and used to display the image.

11 Claims, 1 Drawing Sheet

MULTIPLE-FUNCTION PROJECTING APPARATUS

FIELD OF THE INVENTION

The present invention relates to a multiple-function projecting apparatus, especially to a multiple-function and stand-alone projecting apparatus with network, multimedia and wireless features.

BACKGROUND OF THE INVENTION

Projectors are used to reproduce a larger image on a projecting screen by projecting light beam and widely used for presentation in meeting and tuition. The content displayed by projectors are gradually changed from dull still slide to more vivid animated graphic. Moreover, the projectors gain much progress in weight, size and resolution.

The commercially available projectors are listed below.

1. Overhead Projector

This is an old-fashion type projector used to display transparency. The transparency is generally prepared by using a printer, which is a time consuming job.

2. Slide Projector

This is another old-fashion type projector used to display slide, which has better resolution and color. However, slides also should be prepared in advance. This is also a time consuming job and no animated effect is available.

3. CRT Projector

This projector employs three electron guns to project light beams of three primary colors and can provide animated effect. However, the CRT projector is bulky and of high cost. Therefore, the CRT projector is generally used in meeting room and audiovisuals application.

4. LCD Panel and Spot Light Projector Assembly

The LCD panel is used to display image from a computer and the spot light projector is used to project the image to a screen. When being stand-alone, the spot light projector can be used as a slide projector. However, the overall assembly is still bulky.

5. Single Gun CRT Projector

The single gun CRT projector is mainstream product with easy maintenance, easy operation, high brightness and portability. However, the prices of the single gun CRT projector are greatly deviated by its brightness specification and resolution.

Moreover, the existing single gun CRT projector is used with computer and now reflective LCD type unit and digital signal processing type unit are available.

However, the above-mentioned projectors are not stand-alone unit and should be used with computer, for example, desktop computer, notebook computer or palm computer. Moreover, the existing projectors do not have network function.

SUMMARY OF THE INVENTION

It is an object of the present invention to provide a multiple-function projecting apparatus having built-in operation system, browser for Internet accessing and presentation program such that the projecting apparatus can provide presentation by itself alone without using a computer.

It is another object of the present invention to provide a multiple-function projecting apparatus connected to Internet or LAN through wireless or wired interfaces.

It is still another object of the present invention to provide a multiple-function projecting apparatus with expansion memory card to expand data storage.

It is still another object of the present invention to provide a multiple-function projecting apparatus with great portability.

To achieve above object, the present invention provides a multiple-function projecting apparatus comprising processor unit, an audio I/O interface, a wireless communication interface, a wired communication interface, an expansion memory interface, a display driver interface and a display unit. The processor unit is a controller of the projecting apparatus and has built-in operation system and application programs. The audio I/O interface is connected to the processor unit and used to playback an audio data and receive external voice input. The wireless communication interface is connected to the processor unit and provides wireless access to Internet, wireless connection to external network device and communication to a wireless or wired communication device. The wired communication interface is connected to the processor unit and connected to external device through wire as well as connected to Internet and LAN through wired interface. The expansion memory interface is connected to the processor unit and provides an interface for expansion memory card through which data can be accessed. The display driver interface is connected to the processor unit and used to output an image from the processor unit. The display unit is connected to the display driver interface and used to display the image.

The various objects and advantages of the present invention will be more readily understood from the following detailed description when read in conjunction with the appended drawing, in which:

DETAILED DESCRIPTION OF THE INVENTION

Figure 1:
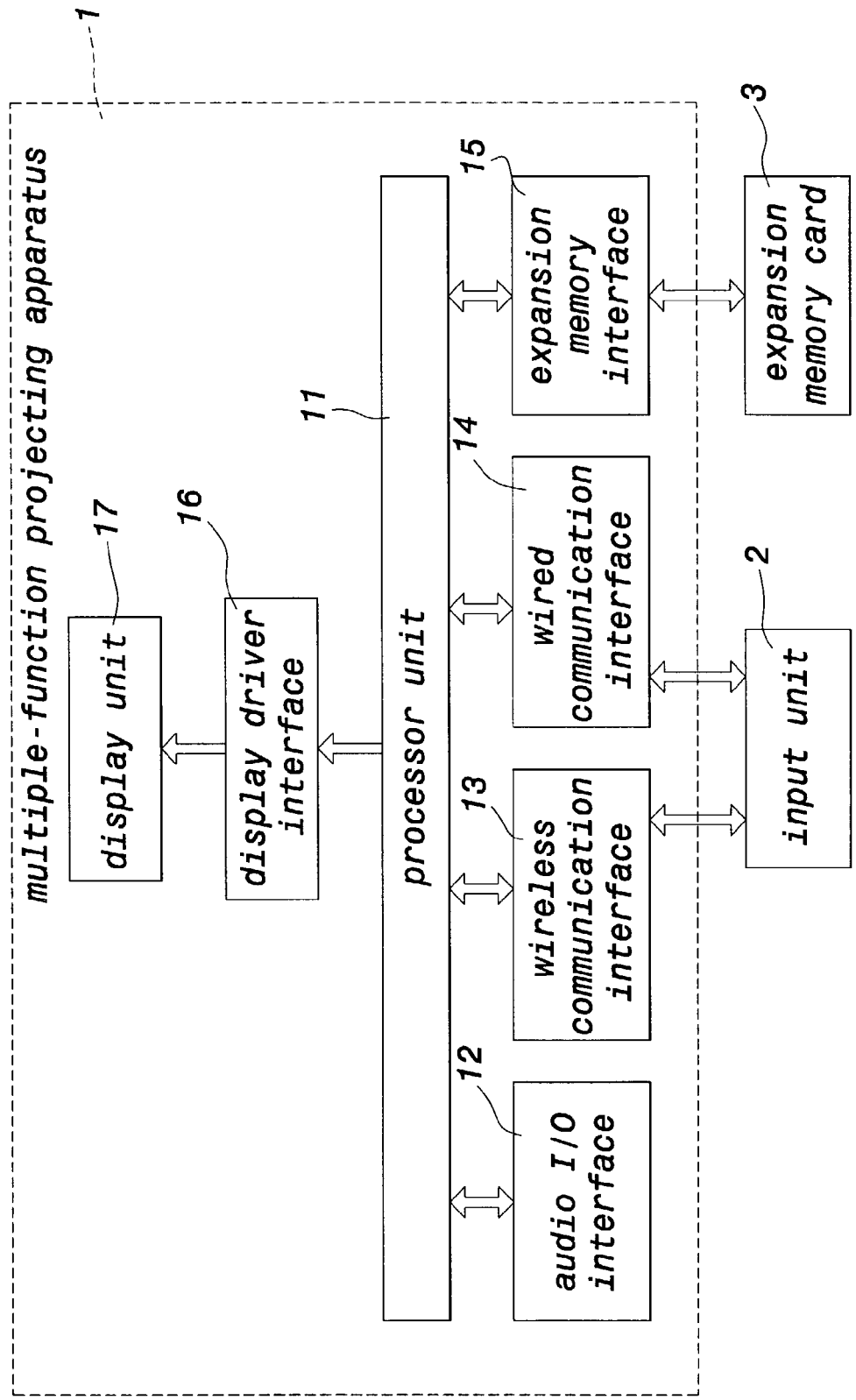
FIG. 1 shows a block diagram of the present invention.

FIG. 1 shows a block diagram of the present invention. The multiple-function projecting apparatus 1 according to the present invention has a built-in processor unit 11. The processor unit 11 is embedded with operation system such as Window CE.NET, application programs such as IE, Netscape, presentation program such as Picture Slide Show, PowerPoint Presentation, and multimedia programs such as MPEG player, MP3 player, Real player and Media player. Therefore, the multiple-function projecting apparatus is not required to connect with a computer and has network-accessing function by built-in browser, and presentation function by built-in presentation program.

The processor unit 11 is connected to a plurality of interfaces including an audio I/O interface 12, a wireless communication interface 13, a wired communication interface 14, an expansion memory interface 15 and a display driver interface 16.

The audio I/O interface 12, for example, is AC97 interface and has a headphone jack to send music to loudspeaker or headphone and a microphone jack to receiver external audio data.

The wireless communication interface 13, for example, can be IEEE 802.11a, IEEE 802.11b, bluetooth, RF, Hiper Lan, IrDA, laser beam etc. Therefore, the multiple-function projecting apparatus according to the present invention has wireless accessing ability for Internet and wireless connection to other unit. For example, the multiple-function projecting apparatus can be wirelessly connected to computer with wireless interface to receive presentation data for remote e-conference and remote teaching function. Moreover, the multiple-function projecting apparatus can be communicated with wireless communication device such as cellulous phone and handheld PC with bluetooth module.

The wired communication interface 14, for example, can be RS-232, PS/2, SCSI, IEEE 802.3, USB, UART or RJ-45 such that the multiple-function projecting apparatus can be connected to other device through cable or connected to Internet through cable or connected to local area network for remote display. Moreover, the multiple-function projecting apparatus can be connected to remote computer through Internet or intranet network.

The multiple-function projecting apparatus can also receive external commands through the wireless communication interface 13 and the wired communication interface 14. The external commands are input through an input unit 2 such as keyboard, mouse, joystick and digital pad with wired/wireless interface or remote controller.

The expansion memory interface 15, for example, can be flash memory interface or disk on chip (DOC) interface through which expansion memory card 3 such as CF card, SM card, secure digital, multi media card and memory stick can be connected. Therefore, presentation data can be read from the expansion memory card 3 through the expansion memory interface 15 besides reading from network. The expansion memory card 3 can also store video game beside presentation data and can support graphic format such as JPEG, GIF, BMP, PNG etc.

The display driver interface 16 is used to output the image from the processor unit 11.

The multiple-function projecting apparatus 1 according to the present invention is connected to a display unit 17 such as LCD, DLP and LCOS through the display driver interface 16 such that the image can be directly displayed without involving VGA line.

By the multiple-function projecting apparatus 1 according to the present invention, extra effort such as installing software to new computer and moving computer to meeting room can be saved.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A multiple-function projecting apparatus, comprising:
   a processor unit being a controller of the projecting apparatus, and having built-in application programs;
   an expansion memory interface connected to the processor unit, and used to receive expansion memory cards;
   an audio I/O interface connected to the processor unit, and used to playback an audio data and receive external voice input, wherein the external voice input is stored in the expansion memory cards via the application programs of the processor unit and the expansion memory interface;
   a wireless communication interface connected to the processor unit and providing wireless access to Internet, wireless connection to external wireless device and communication to a wireless communication device, wherein the wireless communication interface is used to connect with an input unit for storing external data in the expansion memory cards via the processor unit and expansion memory interface;
   a wired communication interface connected to the processor unit, and connected to external device through wire as well as connected to Internet and LAN through wire, wherein the wired communication interface is used to connect with an input unit for storing external data in the expansion memory cards via the processor unit and expansion memory interface;
   a display driver interface connected to the processor unit; and
   a display unit connected to the display driver interface and used to project the images.

2. The multiple-function projecting apparatus as in claim 1, wherein the audio I/O interface is AC 97 interface.

3. The multiple-function projecting apparatus as in claim 1, wherein the wireless communication interface is one of IEEE 802.11a, IEEE 802.11b, bluetooth, RF, Hiper Lan, IrDA, and laser beam.

4. The multiple-function projecting apparatus as in claim 1, wherein the wireless communication device is one of cellulous phone and handheld PC with built-in bluetooth function.

5. The multiple-function projecting apparatus as in claim 1, wherein the wired communication interface is one of RS-232, PS/2, SCSI, IEEE 802.3, USB, UART and RJ-45.

6. The multiple-function projecting apparatus as in claim 1, wherein the multiple-function projecting apparatus receive an external command through the wireless communication interface and the wired communication interface and the external command is input through an input unit.

7. The multiple-function projecting apparatus as in claim 6, wherein the input unit is one of keyboard, mouse, joystick and digital pad with wired/wireless interface and remote controller.

8. The multiple-function projecting apparatus as in claim 1, wherein the expansion memory interface is one of flash memory interface and disk on chip (DOC) interface.

9. The multiple-function projecting apparatus as in claim 1, wherein the expansion memory card is one of CF card, SM card, secure digital, multi media card and memory stick.

10. The multiple-function projecting apparatus as in claim 1, wherein the expansion memory card store video game and presentation data and support graphic format including JPEG, GIF, BMP, and PNG.

11. The multiple-function projecting apparatus as in claim 1, wherein the display unit is a DLP display or a LCOS display.

* * * * *